June 25, 1929.                M. MAAG                1,718,469
                DEVICE FOR TAKING UP THE PLAY IN GEARS
                Filed March 1, 1927        2 Sheets-Sheet 1

INVENTOR
Max Maag
BY
Joseph F. Schofield
ATTORNEY

June 25, 1929.   M. MAAG   1,718,469
DEVICE FOR TAKING UP THE PLAY IN GEARS
Filed March 1, 1927   2 Sheets-Sheet 2
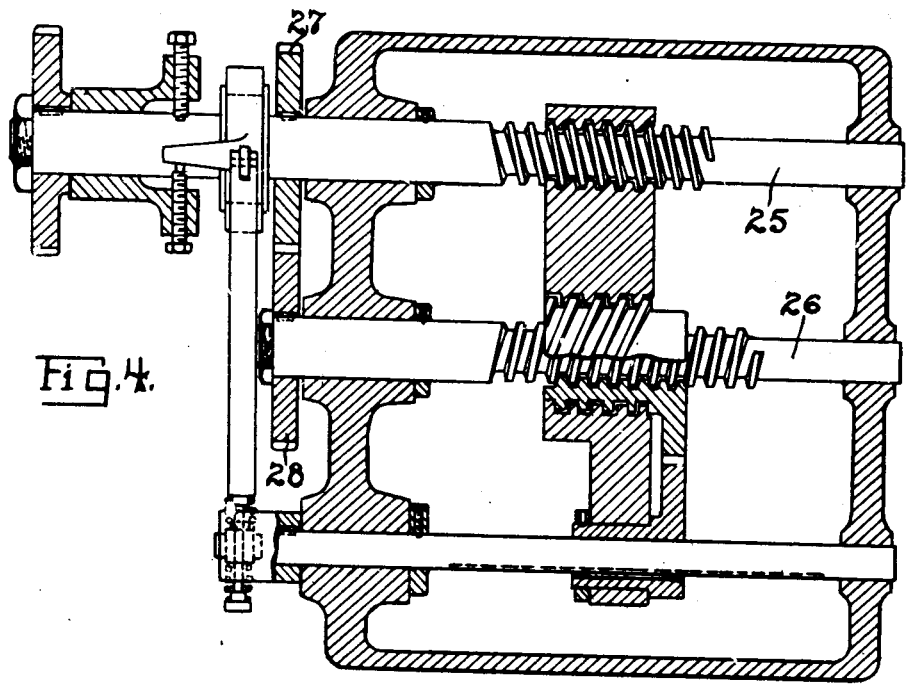
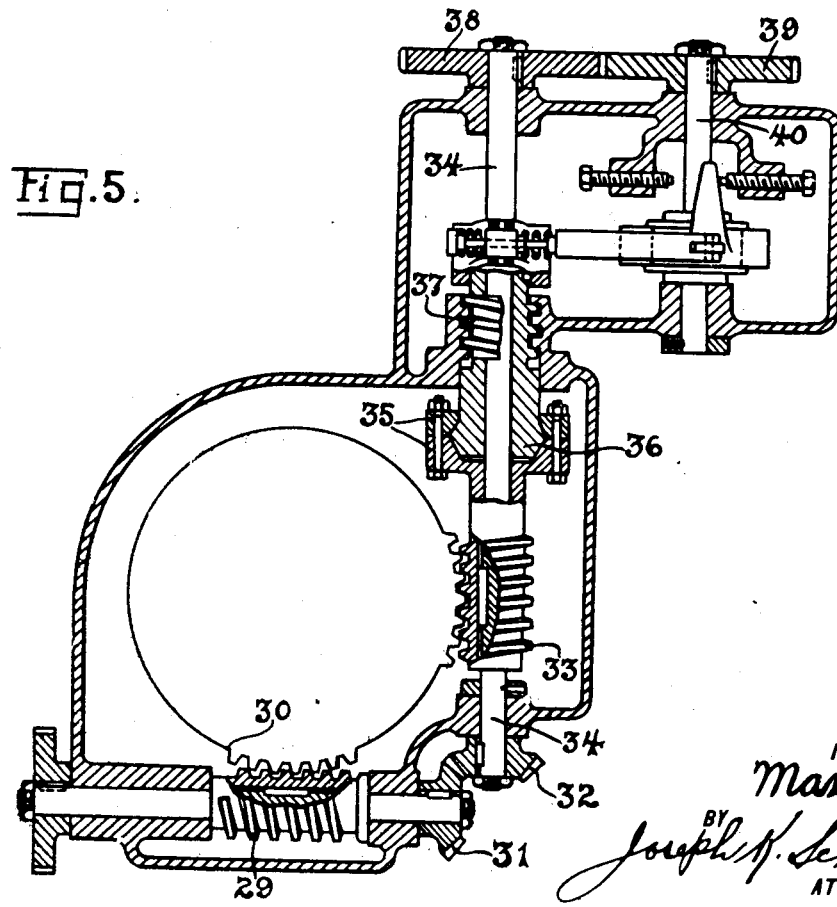
INVENTOR
Max Maag
BY
Joseph K. Schofield
ATTORNEY Patented June 25, 1929.

1,718,469

UNITED STATES PATENT OFFICE.

MAX MAAG, OF WALDGARTEN-SCHWAMENDINGEN, NEAR ZURICH, SWITZERLAND, ASSIGNOR TO MAAG GEAR WHEEL AND MACHINE COMPANY, LTD., OF ZURICH, SWITZERLAND, A CORPORATION OF SWITZERLAND.

DEVICE FOR TAKING UP THE PLAY IN GEARS.

Application filed March 1, 1927, Serial No. 171,868, and in Germany and Switzerland March 3, 1926.

The efficiency of a number of machines having driving means such as worm gears, spindles with travelling nuts, and the like, depends in certain circumstances on the absence of backlash or lost motion between the members constituting said means. The invention described relates to a device for taking up lost motion or backlash in gears of the kind referred to.

More particularly the present invention relates to improvements in constructions similar to that described and claimed in applicant's copending application Serial No. 664,940, filed September 26, 1923.

Figure 1:
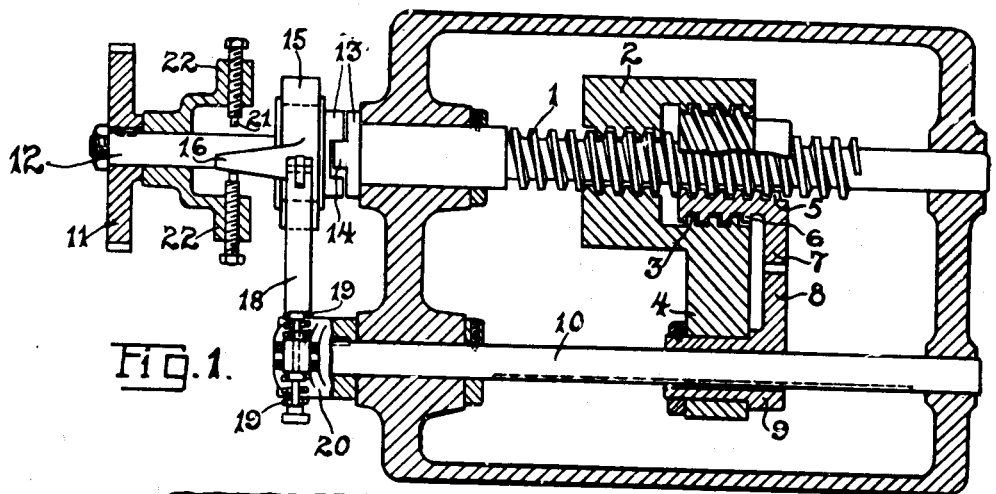
Figure 2:
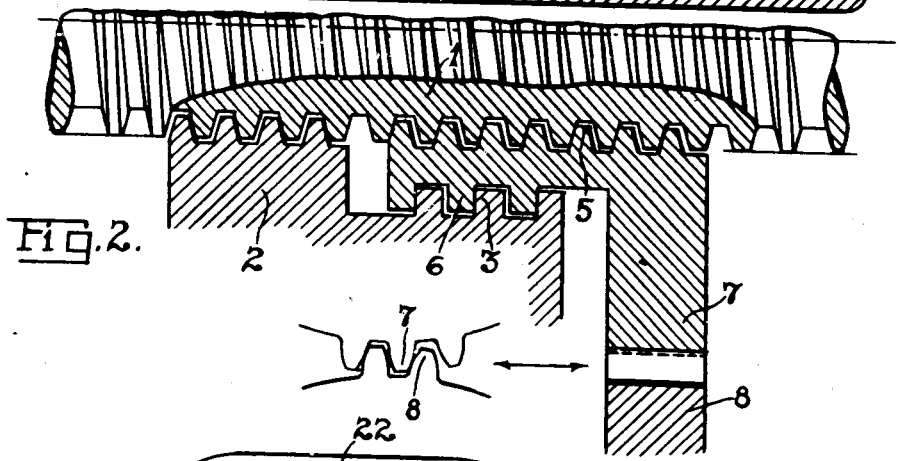
Figure 3:
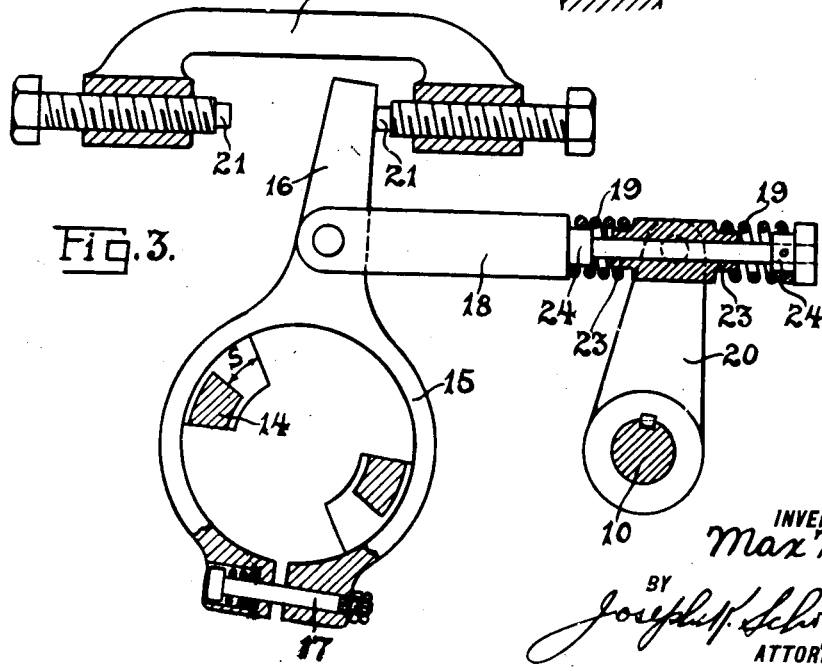

One constructional example of the device according to the present invention as applied to a screw and nut feeding mechanism is illustrated in Figures 1, 2 and 3 of the accompanying drawings, in which Figure 1 is a side elevation, partially in section, of the device, Figure 2 is a section through the spindle and nuts, Figure 3 is a view of the reversing mechanism, partially in section, Fig. 4 shows a second form of the invention applied to a mechanism having two separate screws and nuts, and Fig. 5 shows a form of the invention applied to a worm and worm wheel mechanism.

Referring to Figs. 1, 2 and 3, a screw spindle 1 is mounted in the usual way for example on a lathe for feeding a slide (not shown) through a certain distance. This screw 1 co-operates with a travelling nut 2 rigidly connected to the said slide. The bore of the said nut is enlarged at one end and has an internal screw-thread 3 which is of the same hand as, but of a higher lead than the thread of the screw spindle 1. The travelling nut 2 is moreover provided with an arm 4.

A nut member 5 fitting likewise on the spindle 1 has in addition an external screw-thread 6 engaging the thread 3 of the nut 2. The nut member 5 carries a toothed sector 7 in mesh with the teeth of a similar sector 8 on a sleeve 9 provided with a feather guided in a keyway extending the entire length of a shaft 10 rotatably mounted in the lathe and on which the said sleeve 9 is an easy fit so that it may be moved on the shaft by the travelling arm 4.

In the construction under consideration the spindle 1 is driven by a gear-wheel 11 which first rotates a stub shaft 12 the other end of which is connected to the spindle 1 by a tooth clutch 13, the teeth of which are dimensioned to provide a clearance S (Figure 3) of a certain size so that when the direction of rotation is reversed the clearance must be first travelled through before the stub shaft 12 and the spindle 1 are again in rigid connection. The motive for this arrangement will appear hereinafter in the statement of operation of the device. The stub shaft 12 is moreover fitted with a strap member 15 having an arm 16 and adapted to be contracted by means of a spring-cushioned bolt 17. The strap member 15 is used as a friction coupling for angularly moving the shaft 10 from the stub shaft 12 through the medium of a link 18 actuating the arm 20 through the intermediary of two springs 19, the said arm 20 being fast on the shaft 10. The angular movement of the strap member 15 is limited by two adjustable stops 21 threaded in the ends of a yoke 22 bolted to the frame of the machine. The arm 16 of the strap member 15 moves between these two stops.

As regards the method of operation, the device just described purports to neutralize the slack between the threads on the spindle 1 and on the travelling nut 2 by suitably rotating the nut member 5. The example under consideration deals with right-hand screw-threads. When the gear-wheel 11 rotates the stub shaft 12 and the spindle 1 clockwise (looking towards the front end of the device), the travelling nut 2 is moved towards the gear-wheel and the left face of the thread of the spindle 1 bears upon the thread of the travelling nut 2, as shown in Figure 2. The strap member 15 simultaneously moves the shaft 10 to a small extent, also in a clockwise direction. The toothed sector 8 thus moves the sector 7 and therefore the nut member 5 in opposition to the direction of rotation of the spindle 1. As stated in the foregoing, the thread 6 is of the same hand as that of the spindle, but has a greater lead, so that this angular movement of the nut member 5 causes it to move towards the gear-wheel 11, the distance moved through being greater than that covered by the travelling nut 2, with the result that the nut member 5 can be moved angularly only until all the slack is taken up. The right side or face of the thread of the spindle 1 now lies on the thread of the nut member 5 (Figure 2), the left side or face of the said spindle thread being against that of the travelling nut 2 and finally the threads 3 and 6 are likewise in contact under pressure. In other words the three elements 1, 2 and 5 are all mutually and firmly in contact. When the stub shaft 12 rotates the spindle 1 as described, the arm 20 (Figure 3) is oscillated only until the firm contact just mentioned is produced. The continued movement of the strap member 15 results only in increasing the load on the spring 19 until the arm 16 touches the stop 21, whereafter the strap member 15 slips on the stub shaft 12.

The contact pressure between the spindle 1 and the nut member 5 increases at first when a turn or portion of the spindle thread, having a higher pitch than the rest thereof, engages the thread of the travelling nut 2. The nut member 5 is now moved by the revolving spindle, but since the lead of the spindle thread is less than that of the thread 6, a loosening effect is immediately produced between the spindle and the nut member 5, so that the latter again becomes stationary under the normal pressure of the spring 19.

The operation of the device is of course identical for both directions of rotation of the spindle 1, so that only the movements of parts during the transitory period of reversal need be described. When reversing the angular motion of the spindle 1, the latter, with the assistance of the loaded spring 19, would cause the travelling nut 2 and the nut member 5 to be jammed against one another. This is prevented by providing the clearance S (Figure 3) between the dogs 14 of the coupling 15, whereby the direction of rotation of the spindle 1 is reversed only after this clearance is moved through by the dogs. While this is proceeding the strap member 15 releases the left-hand spring 19 and lightly loads the right-hand spring, so that the nut member 5 is loose when the spindle begins to rotate in the other direction, the said nut being pressed against the non-driving face or side of the spindle thread by the shaft 10 being further rotated. Normal conditions of operation of the device are now prevailing again. Should the nut member 5 remain in an incorrect position when the direction of rotation is reversed, the two bosses 23 and 24 come into contact and the resulting impact loosens the nut.

Figure 4 shows the same type of device fitted with two separate screw spindles 25 and 26, the other elements being as in the construction just described. The main and auxiliary spindles 25 and 26 respectively are in operative connection through two spur gear-wheels 27 and 28. The coupling 13 of Figure 1 with its clearance S (Figure 3) may be dispensed with and the duty performed thereby may be devolved to the said gear 27—28. The advantage of the construction of Figure 4 is that the axial slack of the main spindle 25 in the bearings of the machine can likewise be removed as for the spindle 1 of Figure 1.

Figure 5 shows the said device as adapted to neutralize slack in a worm drive. The essential slack-removing elements coincide with those of Figure 4. A main worm 29 rotates a worm-wheel 30 and also a locking worm 33 through the medium of a bevel gear 31—32. The said locking worm 33 is an easy fit on the shaft 34 and longitudinally (but non-revolubly) movable thereon. A double conical friction ring 35 is rigidly connected to the worm 33. A suitable friction member 36, in no way connected to the shaft 34, is adapted to rotate within the said ring at a certain frictional pressure. The hollow stem of the friction member 36 has an external screw-thread 37 which is of the opposite hand to the thread of the worm 33. The nut member engaging the thread 37 is integral with the cast frame of the machine. The shaft 34 is fitted with an arm corresponding to the arm 20 of Figure 3 and likewise co-operating with elements like 15, 16, 17, 18 and 19, the movements of which are limited by two stops 21. A coupling with clearance, such as 13—14 may likewise be dispensed with in the worm gear under consideration. The shaft 34 rotates a stub shaft 40 (corresponding to the stub shaft 12 of Figure 1) through the medium of two gear-wheels 38 and 39. Again a strap member such as 15 is adapted to slip on the stub shaft 40 to form a friction coupling co-operating with elements such as 18, 19 and 20. Thus the thread 37 is rotated in opposition to the direction of rotation of the worm 33 so that the latter is shifted on the shaft 34 through the medium of the two-cone friction coupling 35, 36, with the consequence that the said worm 33 opposes with self-produced light pressure the rotation of the worm wheel 30, for the purpose of neutralizing the slack in the worm drive.

If now a larger or thicker tooth of the worm wheel 30 engages the thread of the worm 29, the antagonistic action of the locking worm 33 and the frictional pressure between the cone members 35 and 36 are at first increased, the friction member 36 is thereby rotated by the friction ring 35. The thread 37 is now screwed out slightly and loosens the worm 33 from the worm wheel 30 until the pressure between them is balanced by the action of the spring 19 (Figure 3). It will be seen that the operation of this construction is the same as that of the constructions shown in Figures 1 to 4.

The constructions described and illustrated are selected out of many possible embodiments, the essence of the invention being the method of neutralizing slack and compensating for irregularities in the pitch or lead of the screws 1 and 25 and the spacing of the teeth in the worm gear 30.

What I claim is:

1. A lost motion compensating device comprising in combination, a driven member, a driving member engaging said driven member, a member threadedly engaging said driving member and said driven member, frictional means operating to oscillate said threaded member relative to said driven member upon reversal of rotation of said driving member, means operated by rotation of said driving member to force said driven member as far as possible in one direction when rotating in one direction and in the opposite direction when rotating in the opposite direction, and a lost motion connection in the rotating means for said driving member whereby said threaded member is oscillated prior to the reversal of rotation of said driving member.

2. A lost motion compensating device comprising in combination, a lead screw, a pair of nuts engaging said lead screw and threadedly engaging each other, one of said nuts being rotatable relative to the other, rotating means for said lead screw, a lost motion positive clutch in said rotating means, means to effect oscillatory motion of said second nut relative to said first nut, said means comprising a frictionally oscillated arm, a lever oscillated by said arm, and means connecting said lever and said second nut.

In testimony whereof I affix my signature.

MAX MAAG.